United States Patent [19]

Wah Lo

[11] Patent Number: 4,766,684

[45] Date of Patent: Aug. 30, 1988

[54] LENTICULAR SCREEN FOR OUTDOOR DISPLAY

[76] Inventor: Allen K. Wah Lo, 5022 Hidden Branches Dr., Dunwoody, Ga. 30338

[21] Appl. No.: 37,012

[22] Filed: Apr. 10, 1987

[51] Int. Cl.[4] .............................................. G03B 25/02

[52] U.S. Cl. ........................................ 40/454; 40/615

[58] Field of Search ................. 40/454, 427, 453, 616, 40/561; 350/103, 106

[56] References Cited

U.S. PATENT DOCUMENTS

| | | | |
|---|---|---|---|
| 2,833,176 | 5/1958 | Ossoinak | 40/454 |
| 3,586,592 | 6/1971 | Cahn | 40/454 |
| 4,420,221 | 12/1983 | Sparks | 40/454 |
| 4,663,871 | 5/1987 | Young | 40/454 |

*Primary Examiner*—Gene Mancene

*Assistant Examiner*—Wenceslao J. Contreras

[57] ABSTRACT

A lenticular screen display designed for viewing in sunlight which comprises an array of parallel, horizontally arranged cylindrical lenticules with a sequence of animated images on a section located in the top portion of the focal plane of the lenticules, and means for preventing the sun's rays from focusing on the focal plane of the lenticules so as to prevent burning the image bearing sections. The means for preventing the sun's rays from focusing on the image bearing section can be diffusers or reflectors located in the lenticule at the appropriate position. Another means is to alter the focal length of the lower portion of the lenticules so it is either less or greater than the focal length of the top portion. A further means is to make the top portion of the front surface of the lenticule flat.

12 Claims, 4 Drawing Sheets

LENTICULAR SCREEN FOR OUTDOOR DISPLAY

BACKGROUND OF THE INVENTION

In the past, attempts have been made to produce animated pictures for outdoor displays, such as posters and billboards. In animated displays, a sequence of animated images is printed or placed on a sheet behind a lenticular screen at its focal plane. The effort to produce animated pictures for outdoor displays has not been successful to this date because the lenticular screen for viewing the images also serves to focus the high intensive beam of sun's rays onto the focal plane of the lenticules which tends to burn out the image bearing sheet.

SUMMARY OF THE INVENTION

It is the objective of this invention to produce lenticulated animated pictures for outdoor displays, such as posters and billboards, so that the displays are not burnt out by the concentration of the sun's rays focused by the lenticular screen on the focal plane of the lenticules. The object of the animated display appears to be moving as the observer moves towards or away from the display. This is achieved by printing a sequence of animated images under the lenticules. The observer will see only one of these images from a particular vantage point and a different image from another vantage point.

It has been discovered that the objective of this invention can be obtained by using a lenticular screen which is so designed that the cylindrical lenticules are arranged in parallel in the horizontal direction. There is a multiplicity of images located only on the top portion of the focal plane of the lenticules. Images need not be located on the lower portion of the lenticules since they can not be seen through the lenticules by the observer who is positioned below the horizontal plane intersecting the vertical midpoint of the lenticules. However, the images located on the top portion of the focal plane of the lenticules would not be burned out by the sunlight due to the relatively high angle of the sun. Basically, the image bearing section located in the lower portion of the lenticules is protected from solar energy by preventing the sun's rays from focusing on the focal plane of the lenticules where the image bearing section is located. This can be achieved by several methods. A diffuser or reflector can be located in the top front portion of the lenticules or the lower back portion of the lenticules to diffuse or reflect the sun's rays so that they will not focus on the same focal plane in which the image bearing section is located. The top portion of the front surface of the lenticule can be made flat so the sun's rays are diffused and not focused on the image bearing section.

Another means is to alter the designed focal length of the lower portion of the lenticules so as to prevent the sun's rays from focusing on the image bearing section. The focal length of the lower portion of the lenticules can be altered to a shorter length so that the sun's rays will focus in front of the image bearing section (thick lens lenticule), and in another embodiment, the focal length of the lower portion of the lenticules can be altered to a longer length so that the sun's rays will focus behind the image bearing section (thin lens lenticule).

DETAILED DESCRIPTION OF THE DRAWINGS

Figure 1:
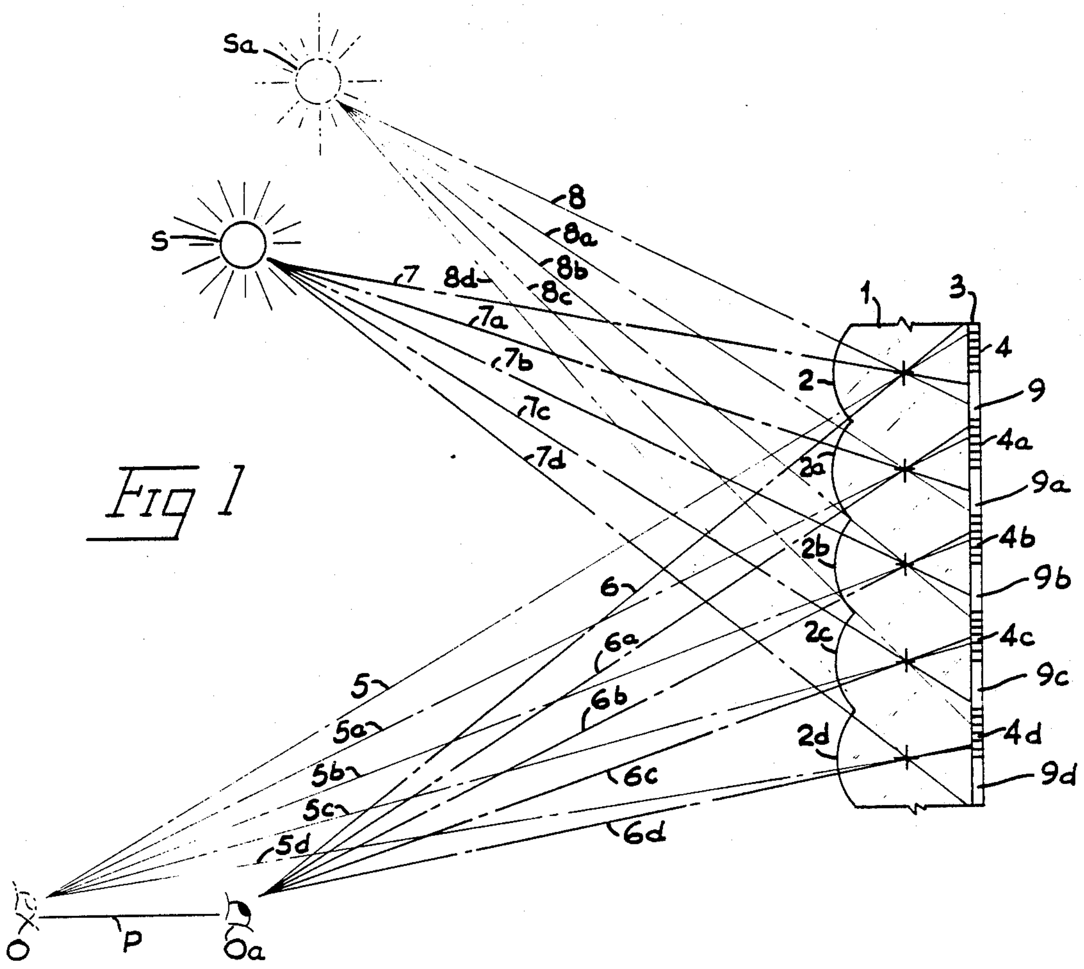
FIG. 1 is a vertical sectional view of a lenticular screen display. It illustrates the angles for viewing the animated display on the image bearing section and the projecting angle of the sun.

FIG. 1 is a vertical sectional view of an outdoor lenticular screen for displaying an animated sequence of an object. It illustrates the angles for viewing the animated object and the projecting angle of the sun. The display 1 consists of a plurality of lenticules 2, **2*a*, 2*b*, 2*c*, 2*d*, an image bearing section 3 and the sequence of animated images 4, 4*a*, 4*b*, 4*c*, 4*d* located in the top back portion of the lenticule and in the focal plane of the lenticule. observer moving along line P from point O to Oa will see a different image of the animated sequence due to the changing of viewing angle of the lenticules. As in an automobile, at position O the observer may see the man in the display starting to rise from the sitting position as images from the lines of sight 5, 5*a*, 5*b*, 5*c*, 5*d* come to view. When the observer reaches the position Oa, he will see the man in a standing position from lines of sight 6, 6*a*, 6*b*, 6*c*, 6*d*. In this way, images printed on the image bearing section 3** of the lenticules appear to be animated. However, from any viewing position along line P, the viewing angle of the observer intersects only the top portion of the focal plane of the lenticules due to the relatively low viewing angle.

The position of the sun S and Sa is always higher than the lenticular screen display. The sun's rays only focus on the lower portion of the focal plane of the lenticules through projection lines 7, **7*a*, 7*b*, 7*c*, 7*d*, and 8, 8*a*, 8*b*, 8*c*, 8*d*** as the sun travels in relation to the display.

The lenticular screen can be fabricated with all the lenticules in one large array, or in small sections, or by assembling in single lenticules together. The width, thickness and angle of the lenticule can vary based on the size of the display and the viewing distance. The lenticular screen can be made from any optical grade material such as plastic, glass or crystal. The design of the lenticular screen can be a thick lens design or a thin lens design.

The images on the image bearing section can be produced by printing or by a photographic process. For example, the images could be printed on the back surface of the lenticule. In addition, the images could be formed on a separate image bearing sheet. The images on this sheet could be photographs or be formed by printing, such as flexographic or offset.

As an example, photographs of a man could be taken in a sitting position and printed on image bearing section 3 adjacent to the intersection of lines of sight 5, **5*a*, 5*b*, 5*c*, 5*d*. Photographs could be taken of the man in a standing position and printed on the image bearing section 3 adjacent to the intersection of lines of sight 6, 6*a*, 6*b*, 6*c*, 6*d***. Additional photographs could be taken of the man intermediate the sitting and standing position and printed between these respective lines.

The outdoor display shown in FIG. 1 would not be satisfactory for use as it would have the images 4, **4*a*, 4*b*, 4*c*, 4*d* burnt out by the sun's rays focusing on the image bearing section 3 as there is no method for preventing this from happening shown in FIG. 1**.

Figure 2:
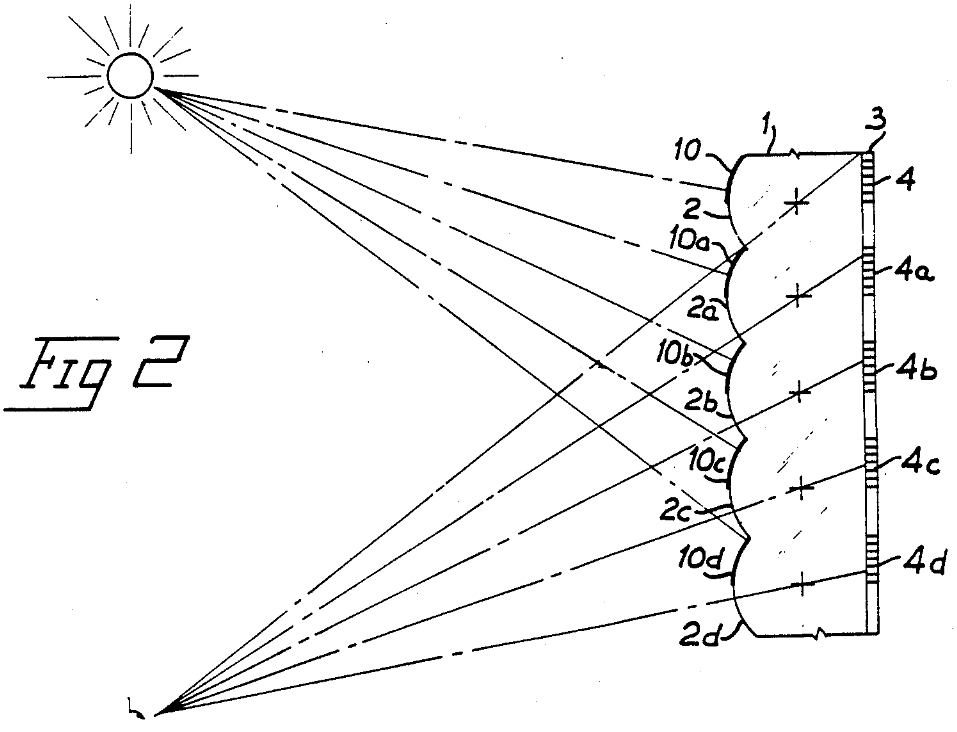
FIG. 2 is a vertical section of a lenticular screen display with diffusers or reflectors located on front top portion of the lenticules to prevent the sun's rays from focusing on the image bearing section.

FIG. 2 illustrates one method of preventing the sun's rays from focusing on the image bearing section 3 burning out images 4, **4*a*, 4*b*, 4*c*, 4*d*. FIG. 2 is a vertical sectional view of an outdoor display. The method of preventing the sun's rays from focusing on image bearing section 3 is to place a diffuser or reflector 10, 10*a*, 10*b*, 10*c*, 10*d* in the front top portion of the lenticule. The diffuser or reflector can be formed as an integral part of the top curved front surface of the lenticule or can be placed in the front internal part of the lenticule. The mirror can be formed of any suitable reflective material, such as a conventional glass mirror or polished aluminum. The mirrors 10, 10*a*, 10*b*, 10*c*, 10*d*** illustrated have the same curvature as the curved screen of the lenticule. However, it should be understood that the mirrors or deflectors could be of conventional flat construction.

Diffusers can be used in lieu of mirrors. The diffuser can be made of translucent or transparent material with surface irregularities to diffuse the light so that only a small portion of the sun's rays will focus on the image bearing surface 3 of each lenticule. Diffusers usually have surface irregularities. The diffuser can be constructed of glass or plastic with irregular surfaces.

Figure 7:
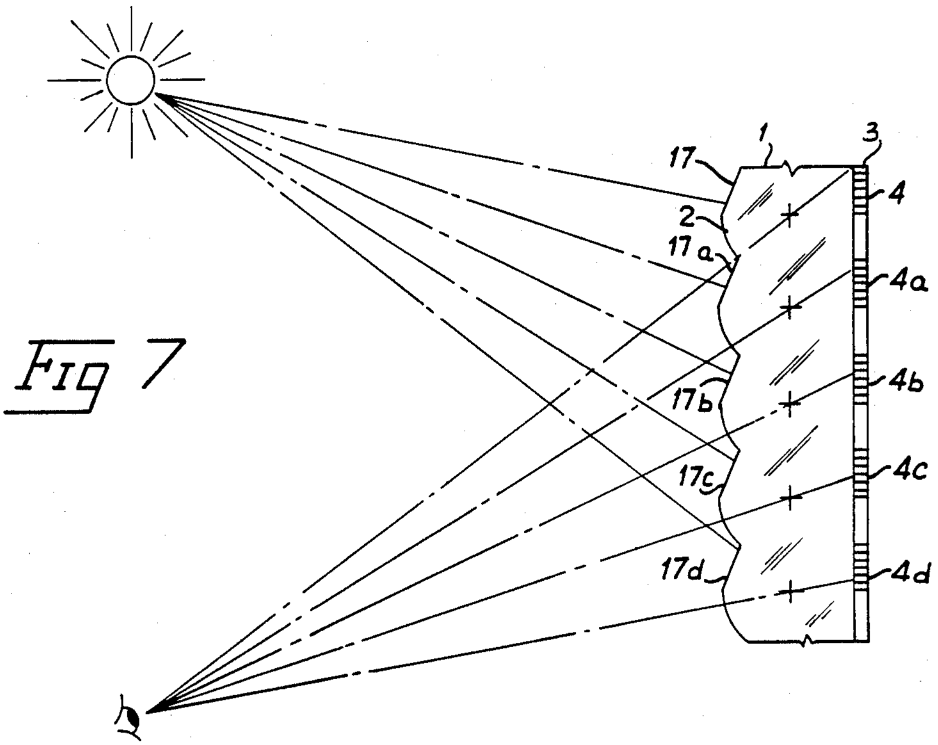
FIG. 7 is a vertical sectional view of an outdoor lenticular screen display in which the top portion of the front surface is flat to prevent the sun's rays from focusing on the image bearing section.

FIG. 7 illustrates another method of preventing the sun's rays from focusing on the image bearing section 3. The top portion 17, **17*a*, 17*b*, 17*c*, 17*d* of the front surface of each lenticule is made flat so that the sun's rays are not focused on the image bearing section 3, but are diffused. The diffusion of the sun's rays also serves to illuminate the images 4, 4*a*, 4*b*, 4*c*, 4*d*. The top portion 17, 17*a*, 17*b*, 17*c*, 17*d* can be curved inwardly if desired rather than being made flat. It is important that it be constructed so that it does not curve outwardly to such a degree that it focuses the sun's rays on the image bearing section 3**.

Figure 3:
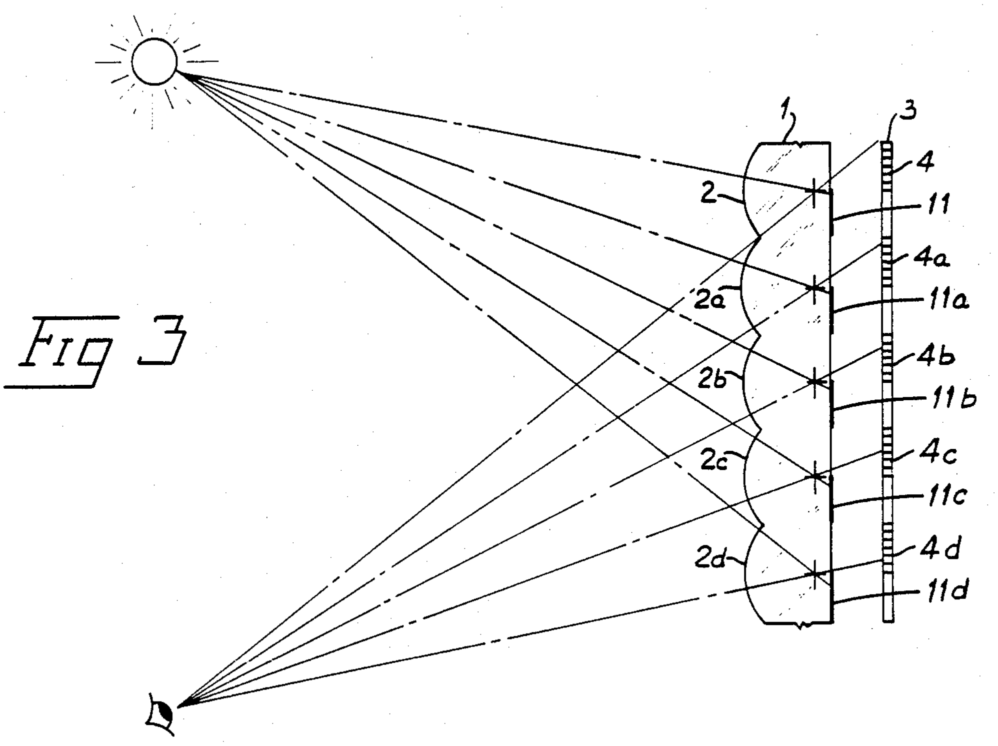
FIG. 3 is a vertical section view of an outdoor lenticular screen display with diffusers or reflectors located in the lower back portion of the lenticules to prevent the sun's rays from focusing on the image bearing section. The diffusers or reflectors are generally parallel to the image bearing section.

FIG. 3 is a vertical sectional view of an outdoor lenticular screen which has a diffuser or reflector 11, **11*a*, 11*b*, 11*c*, 11*d* located in the lower back portion of each lenticule so as to prevent the sun's rays from focusing on the image bearing section 3. The diffusers or reflectors 11, 11*a*, 11*b*, 11*c*, 11*d* are located in a plane generally parallel to the image bearing section 3. The diffusers or reflectors in FIG. 3 can be formed as an integral part of forming the lenticular screen or can be a separate sheet attached to the back of the plurality of lenticules. The image bearing section 3 is shown in FIG. 3 as a separate sheet. The image bearing sheet 3 can be attached to the back of the lenticule by gluing or any other satisfactory attachment means. In FIG. 3 the image bearing section 3** is shown with a space between it and the rest of the lenticular screen. This space may facilitate the placement and changing of the image bearing sheet by utilization of a holder in which the image bearing section is held in position. However, it is essential that the image bearing section be in the focal plane of the lenticular screen.

Figure 4:
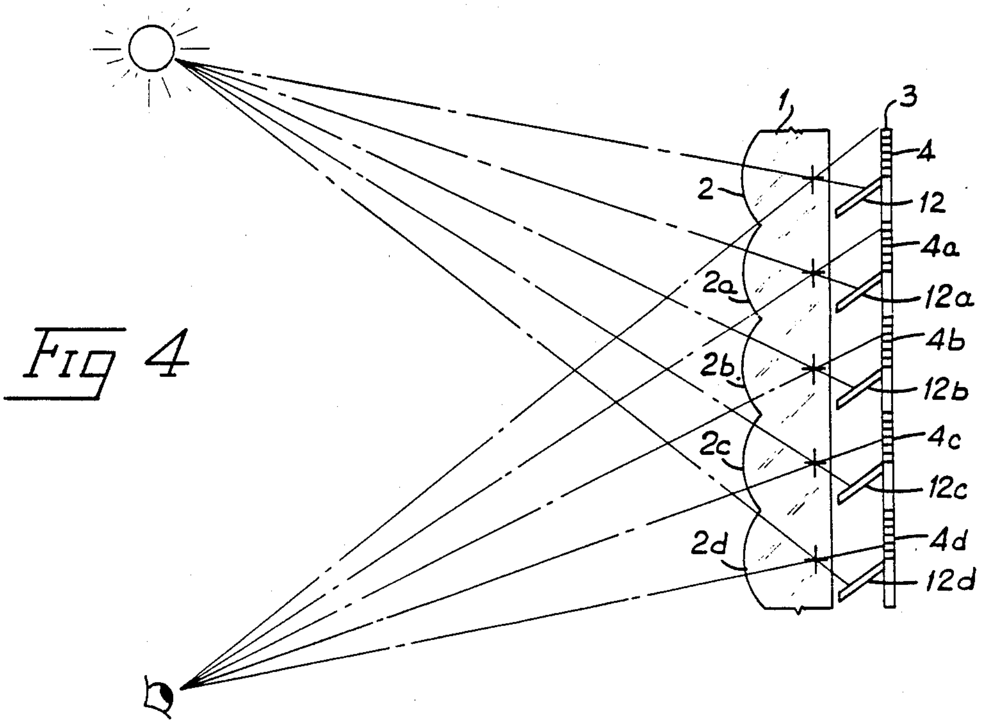
FIG. 4 is a vertical sectional view of an outdoor lenticular screen display with diffusers or reflectors located behind the back of each lenticule, the top surface of the diffusers or reflectors being at an obtuse angle to an image bearing section so as to prevent the sun's rays from focusing on the image bearing section.

FIG. 4 is a vertical section of a lenticular screen with a diffuser or reflector 12, **12*a*, 12*b*, 12*c*, 12*d* located in the lower back portion of the lenticules so as to prevent the sun's rays from focusing on the image bearing section 3. The diffuser or reflector 12, 12*a*, 12*b*, 12*c*, 12*d* is shown in FIG. 4 as attached to the image bearing section 3 and could be formed as an integral forming the image bearing section 3 which could be placed in a holder behind the lenticular screen display 1. Conventional flat surface mirrors or diffusers 12, 12*a*, 12*b*, 12*c*, 12*d* are illustrated in FIG. 4. Mirrors or reflectors are located so that the top surface in the mirror or reflector is at an obtuse angle to the image bearing section 3. This is essential to permit the observer to view the images 4, 4*a*, 4*b*, 4*c*, 4*d* and also for the reflector or diffuser to prevent the sun's rays from focusing on the image bearing section 3. The reflectors can be positioned so that a portion of the sunlight is reflected by the reflectors onto the image bearing section 3**. Care needs to be taken so that the reflectors do not focus light on the image bearing section so as to burn out the images.

In place of flat surface, the mirrors can be concave or convex. A concave mirror will focus the light from the sun near the top portion of each lenticule 2, **2*a*, 2*b*, 2*c*, 2*d*. A convex mirror can also be used which will result in scattering of the sun's rays from the front to the back of each lenticule. However, care must be used in utilizing a convex mirror to prevent too many of the rays of the sun from focusing on the image bearing section and resulting in burning the images 4, 4*a*, 4*b*, 4*c*, 4*d***.

Figure 5:
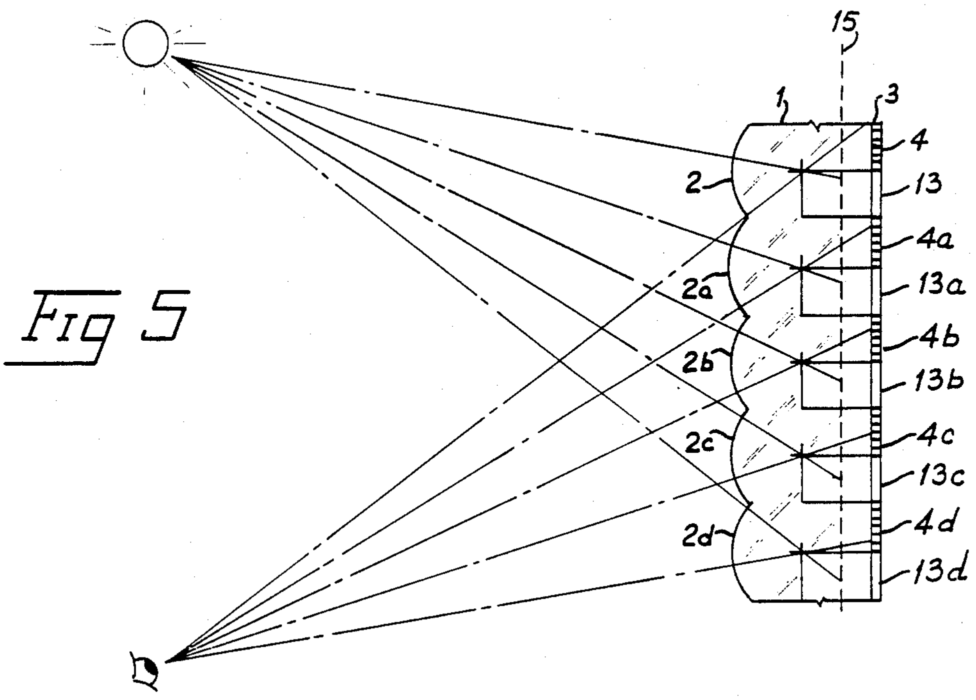
FIG. 5 is a vertical sectional view of an outdoor lenticular screen display with the lower portion of the lenticules being thinner and having a shorter focal length than the top portion of the lenticules so as to prevent the sun's rays from focusing on the image bearing section.

Another method of preventing the sun's rays from focusing on the image bearing section 3 is illustrated in FIG. 5. FIG. 5 is a vertical sectional view of an outdoor lenticular display screen with a thick lens. The lower back portions of lenticules 2, **2*a*, 2*b*, 2*c*, 2*d* are thinner and have a shorter focal length so that the sun's rays are focused at plane 15 before reaching the image bearing section. The lower portion of the lenticule is made shorter by having a cutout portion in the lower back portion of the lenticule. Portions 13, 13*a*, 13*b*, 13*c*, 13*d* of the image bearing section 3 can either be open or not printed with images as it would not be seen by the observer. Portions 13, 13*a*, 13*b*, 13*c*, 13*d*** are located in the back of the lower portion of each lenticule which has the portion of the lens with the shorter focal length.

Figure 6:
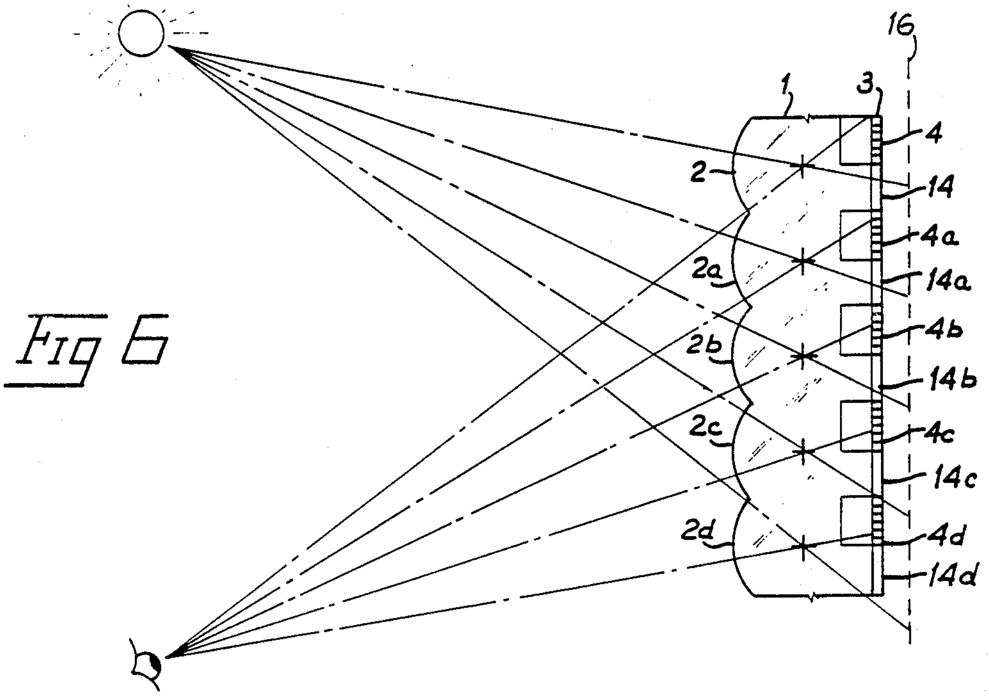
FIG. 6 is a vertical sectional view of an outdoor lenticular screen display with the lower portion of the lenticules being thicker and having a longer focal length than the top portion so as to prevent the sun's rays from focusing on the image bearing section.

FIG. 6 is a vertical sectional view of an outdoor lenticular display screen having a thin lens. The lower portion of lenticule 2, **2*a*, 2*b*, 2*c*, 2*d* is thicker than the top portion of such lenticule, and the bottom portion has a longer focal length. This results in the sun's rays being focused at plane 16 behind the image bearing section 3. Portions 14, 14*a*, 14*b*, 14*c*, 14*d* of the image bearing section 3 are either translucent or open to permit the sun's rays to focus in focal plane 16. The lenticular screen located in FIGS. 5 and 6 can be constructed in the manner to those shown in FIGS. 1–4. The bottom or top portion of the back of each lenticule in FIG. 5 or 6** can be cut away after the lenticule has been constructed. Alternatively, the lenticules can be molded plastic with the mold constructed for forming the cutaway portion of the lenticule.

It should be pointed out that the reflective surface of the reflectors used in FIGS. 2–4 may be produced by coating an appropriate substrate with a reflective material. The diffusing surface of the diffuser can be obtained by coating a translucent material in the appropriate location on the lenticule or by forming an irregular surface directly on the lenticule at the appropriate position.

One advantage of using a diffuser is that it can defocus the sun's rays significantly increase the brightness of the images on the display.

Several methods have been disclosed to produce outdoor displays with animated images which will not be burned by the sun's rays. A diffuser or reflector can be formed in the front top portion of the lenticule. The top portion of the front surface of the lenticule can be made flat. In addition, a diffuser or a reflector can be located in the lower back part of the lenticules on a plane generally parallel to the plane of the image bearing section 3. In addition, a mirror or a reflector can be located in the back lower portion of the lenticules with the top surface of the mirror or reflector being at an obtuse angle to the image bearing section.

These methods permit the construction of practical animated outdoor displays.

I claim:

1. A lenticular screen with a multiplicity of animated images designed for displaying in sunlight, said lenticular screen consisting of a multiplicity of horizontally arranged cylindrical lenticules with each lenticule having top and bottom portions and front and back portions, an image bearing section with a multiplicity of images located in the top portion in the focal plane of the lenticules, said lenticular screen display having means for preventing the sun's rays from focusing in the same focal plane in which the image bearing section is located so as to prevent the images from burning.

2. The lenticular screen display of claim 1 in which the means for preventing the sun's rays from focusing in the same focal plane in which the image bearing section is located are diffusers for diffusing the sun's rays, said diffusers being located in the top front portion of the lenticules so as not to interfere with viewing the images.

3. The lenticular screen display of claim 1 in which the means for preventing the sun's rays from focusing in the same focal plane in which the image bearing section is located are reflectors for reflecting the sun's rays, said reflectors being located in the top front portion of the lenticules so as not to interfere with viewing the images.

4. The lenticular screen display of claim 1 in which the means for preventing the sun's rays from focusing in the same focal plane in which the image bearing section is located are diffusers for diffusing the sun's rays, said diffusers being generally parallel to the image bearing section and located in the bottom back portion of the lenticules so as not to interfere with viewing the images.

5. The lenticular screen display of claim 1 in which the means for preventing the sun's rays from focusing in the same focal plane in which the image bearing section is located are reflectors for reflecting the sun's rays, said reflectors being generally parallel to the image bearing section and located in the bottom back portion of the lenticules so as not to interfere with viewing the images.

6. The lenticular screen display of claim 1 in which the means for preventing the sun's rays from focusing in the same focal plane in which the image bearing section is located are diffusers for diffusing the sun's rays, said diffusers being located in the lower back portion of the lenticule, each diffuser having a bottom surface and top surface, the top surface forming an obtuse angle with the image bearing section so as not to interfere with viewing the images.

7. The lenticular screen display of claim 1 in which the means for preventing the sun's rays from focusing in the same focal plane in which the image bearing section is located are reflectors for reflecting the sun's rays, said reflectors being located in the lower back portion of the lenticule, each reflector having a bottom surface and top surface, the top surface forming an obtuse angle with the image bearing section so as not to interfere with viewing the images.

8. The lenticular screen display of claim 1 in which the means for preventing the sun's rays from focusing in the same focal plane in which the image bearing section is located is that the lower portions of the lenticules are thinner from front to back and have a shorter focal length than the top portions of the lenticules.

9. The lenticular screen display of claim 1 in which the means for preventing the sun's rays from focusing in the same focal plane in which the image bearing section is located is that the lower portions of the lenticules are thicker from front to back and have a shorter focal length than the top portions of the lenticules.

10. The lenticular screen display of claim 1 in which the image bearing section is an integral part of the lenticule and is formed by printing directly onto the back of the lenticule.

11. The lenticular screen display of claim 1 in which the image bearing section is an image bearing sheet of material that is positioned on the back of the lenticule.

12. The lenticular screen display of claim 1 in which the means for preventing the sun's rays from focusing in the same focal plane in which the image bearing section is located is that the top portion of the front surface of the lenticule is constructed so that it does not curve outwardly so as to focus the sun's rays on the image bearing section.

* * * * *